US012571326B2

(12) United States Patent　　　　(10) Patent No.:　US 12,571,326 B2

Morris　　　　　　　　　　　　　　(45) Date of Patent:　Mar. 10, 2026

---

(54) MOBILE ELECTRIC POWER GENERATION SYSTEM

(71) Applicant: Typhon Technology Solutions (U.S.), LLC, The Woodlands, TX (US)

(72) Inventor: Jeffrey G. Morris, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

(21) Appl. No.: 18/941,452

(22) Filed: Nov. 8, 2024

(65) Prior Publication Data

US 2025/0207506 A1　Jun. 26, 2025

Related U.S. Application Data

(63) Continuation of application No. 18/394,799, filed on Dec. 22, 2023, now Pat. No. 12,163,435.

(51) Int. Cl.
F01D 15/10　　　(2006.01)
F02C 7/04　　　(2006.01)
　　　　(Continued)

(52) U.S. Cl.
CPC ............... F01D 15/10 (2013.01); F02C 7/04 (2013.01); F02C 7/055 (2013.01); F02C 7/18 (2013.01);
　　　　(Continued)

(58) Field of Classification Search
CPC .. F01D 15/10; F01D 25/28; F02C 7/04; F02C 7/055; F02C 7/18; F02C 7/20;
　　　　(Continued)

(56) References Cited

U.S. PATENT DOCUMENTS 7,007,966 B2　3/2006　Campion
9,534,473 B2　1/2017　Morris et al.
　　　　(Continued)

FOREIGN PATENT DOCUMENTS

WO　　WO-2018/044307 A1　3/2018

OTHER PUBLICATIONS

PCT International Search Report and Written Opinion, PCT Application No. PCT/US2023/85776, Apr. 23, 2024, 9 pages.

(Continued)

*Primary Examiner* — David P. Olynick
(74) *Attorney, Agent, or Firm* — Fenwick & West LLP

(57)　　　　ABSTRACT

A system for providing mobile electric power includes a first transport including a gas turbine and a generator and a second transport including an air inlet filter housing and an exhaust stack. The two transports are connectable to each other at an intake connection and an exhaust connection between facing sides of the two transports. The first transport includes first and second inlet ports, and first, second, and third outlet ports on the facing side of the first transport. The intake connection provides filtered air from the air inlet filter housing to the first inlet port as combustion air for the gas turbine, and the second inlet port as cooling air to cool an enclosure of the gas turbine. The exhaust connection exhausts air to the exhaust stack from the first, second and third outlet ports.

19 Claims, 12 Drawing Sheets

(51) Int. Cl.
　　*F02C 7/055*　　　　(2006.01)
　　*F02C 7/18*　　　　(2006.01)
(52) U.S. Cl.
　　CPC ...... *F05D 2220/32* (2013.01); *F05D 2220/76*
　　　　　　　　　　　　　　　　　　　　(2013.01)
(58) Field of Classification Search
　　CPC ............. F05D 2240/90; F05D 2220/32; F05D
　　　　　　　　2220/76; E21B 43/2607; E21B 41/0085
　　See application file for complete search history.

(56) References Cited

U.S. PATENT DOCUMENTS

| | | | |
|---|---|---|---|
| 10,962,305 | B2 | 3/2021 | Morris et al. |
| 11,512,906 | B2 | 11/2022 | Morris et al. |
| 11,598,477 | B1 * | 3/2023 | Seldenrust ............... F16M 3/00 |
| 11,725,582 | B1 | 8/2023 | Morris et al. |
| 2009/0322096 | A1 | 12/2009 | Errera et al. |
| 2014/0157778 | A1 | 6/2014 | Ponnuraj et al. |
| 2016/0177675 | A1 | 6/2016 | Morris et al. |
| 2019/0063326 | A1 | 2/2019 | Davis |
| 2019/0204021 | A1 | 7/2019 | Morris et al. |
| 2020/0408071 | A1 | 12/2020 | Li et al. |
| 2021/0025324 | A1 | 1/2021 | Morris et al. |
| 2021/0102531 | A1 | 4/2021 | Bodishbaugh et al. |
| 2021/0215440 | A1 | 7/2021 | Morris et al. |
| 2022/0258659 | A1 | 8/2022 | Cui et al. |

OTHER PUBLICATIONS

United States Office Action, U.S. Appl. No. 18/394,799, filed Apr. 22, 2024, 15 pages.

\* cited by examiner

1200

START

TRANSPORT A MOBILE SOURCE OF ELECTRICITY TO A LOCATION — 1202

CONVERT THE MOBILE SOURCE OF ELECTRICITY FROM TRANSPORTATION MODE TO OPERATION MODE WITHOUT EXTERNAL MECHANICAL APPARATUS — 1204

GENERATE ELECTRICITY USING THE MOBILE SOURCE OF ELECTRICITY TO POWER ELECTRIC EQUIPMENT — 1206

CONVERT THE MOBILE SOURCE OF ELECTRICITY FROM OPERATION MODE TO TRANSPORTATION MODE WITHOUT EXTERNAL MECHANICAL APPARATUS — 1208

REMOVE THE MOBILE SOURCE OF ELECTRICITY FROM THE LOCATION — 1210

END

*FIG. 12*

MOBILE ELECTRIC POWER GENERATION SYSTEM

CROSS-REFERENCE TO RELATED APPLICATION

This application is a continuation of U.S. patent application Ser. No. 18/394,799, filed Dec. 22, 2023, which is incorporated herein by reference in its entirety.

TECHNICAL FIELD

Embodiments of the invention generally relate to mobile electric power generation, and more particularly to a gas turbine based mobile electric power generation system.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand, or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, substantial amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one or more embodiments, a system for providing mobile electric power is provided which comprises: a first transport including a gas turbine and a generator; and a second transport including an air inlet filter housing. In an operation mode, the first transport and the second transport are connected to each other at an intake connection and an exhaust connection between a facing side of the first transport and a facing side of the second transport. The first transport further includes a first inlet port and a second inlet port on the facing side of the first transport, the intake connection providing filtered air from the air inlet filter housing to the first inlet port and the second inlet port.

In one or more embodiments, a power generation transport is provided which comprises a base frame; a gas turbine and a generator mounted to the base frame; a set of inlet ports adapted to be coupled to an intake connection of a separate air handling transport, the set of inlet ports disposed on a facing side of the power generation transport and including a first inlet port and a second inlet port to intake filtered air from the separate air handling transport, the first inlet port routing the filtered air as combustion air to an intake of the gas turbine and the second inlet port routing the filtered air as cooling air to cool an enclosure of the gas turbine; and a set of outlet ports adapted to be coupled to an exhaust connection of the separate air handling transport, the set of outlet ports disposed on the facing side of the power generation transport and including a first outlet port, a second outlet port, and a third outlet port to exhaust air to an exhaust stack of the separate air handling transport.

In one or more embodiments, a method for providing mobile electric power is provided which comprises: receiving, at a power generation transport, filtered air from an air inlet filter housing via an intake connection, the air inlet filter housing mounted on an air handling transport; channeling a first portion of the filtered air to an intake of a gas turbine on the power generation transport for combustion and a second portion of the filtered air as cooling air to cool an enclosure of the gas turbine; generating electricity using the gas turbine and a generator mounted on the power generation transport; and outputting exhaust air from an exhaust stack via an exhaust connection, the exhaust stack mounted on the air handling transport.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 12 is a flow chart of an embodiment of a method to provide a mobile source of electricity for various applications.

Figure 1:
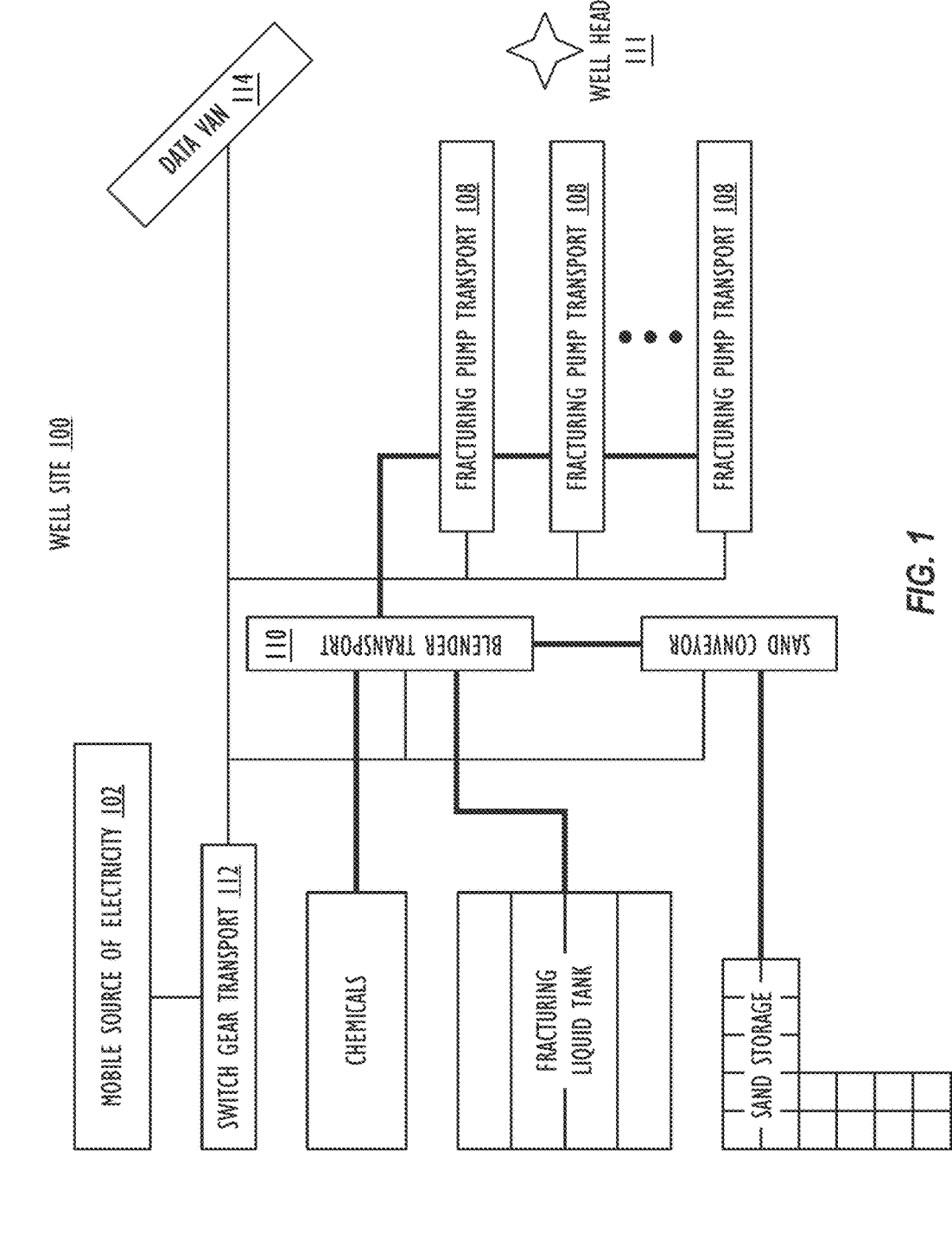
FIG. 1 is a schematic diagram of a mobile hydraulic fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure.

DESCRIPTION

In the following description, for purposes of explanation, numerous specific details are set forth to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all the listed items unless explicitly so defined.

As used herein, the term "transport" refers to any transportation assembly, including, but not limited to, a trailer, truck, skid, and/or barge used to transport heavy structures, such as a gas turbine, a generator, a power generation system, an air handling system, and the like.

As used herein, the term "trailer" refers to a transportation assembly used to transport heavy structures, such as a gas turbine, a generator, a power generation system, an air handling system, and the like, that can be attached and/or detached from a transportation vehicle used to pull or move the trailer. In one embodiment, the trailer may include the mounts and manifold systems to connect the trailer to other equipment.

This disclosure pertains to a mobile source of electricity (e.g., mobile electric power generation system, and the like) that may be configured to provide mobile electric power for different applications or use cases. The mobile source of electricity may be implemented using a plurality of transports (e.g., two transports). The plurality of transports of the mobile source of electricity may include a power generation transport and an air handling transport. In one or more embodiments, the power generation transport may include at least a gas turbine (e.g., Baker Hughes NovaLT™16 gas turbine) and a generator, and the air handling transport may include at least an air inlet filter housing and an exhaust stack.

The power generation transport and the air handling transport are separately and independently movable in a transportation mode. During an operation mode, the power generation transport and the air handling transport are connectable to each other without requiring any external mechanical equipment to interconnect the transports. The power generation transport and the air handling transport are connectable between the longitudinal facing sides of the two transports.

In some embodiments, to simplify connecting the two transports to each other during operation, the transports may be connected to each other at two connections, an intake connection, and an exhaust connection. Intake air (e.g., combustion air, turbine compartment ventilation and cooling air, etc.) required by the power generation transport may be routed to the power generation transport via the intake connection. Similarly, exhaust air (e.g., turbine exhaust air, turbine compartment ventilation and cooling air, generator compartment ventilation and cooling air, and the like) output from the power generation transport may be routed to the exhaust stack on the air handling transport via the exhaust connection and released safely from the top of the exhaust stack. By discharging the exhaust air (e.g., combustion air, ventilation and cooling air) from the top of the exhaust stack via the exhaust connection, an advantageous effect is produced whereby ambient noise caused by the exhausting air is significantly reduced.

The mobile electric power generation system is thus operable to supply electric power for different applications requiring a mobile source of electricity (e.g., well sites, data centers, agricultural applications, hydraulic fracking, and the like). The mobile electric power generation system may be configured to be 'self-sufficient' such that it can be quickly mobilized and de-mobilized without requiring use of external mechanical equipment or apparatus.

For example, the mobile source of electricity may improve mobility by enabling a mobilization and de-mobilization time period of less than 24 hours. The mobile source of electricity may also incorporate a two-transport footprint, where the same two transports may be used for the transportation mode and the operation mode without requiring any external mechanical equipment for mobilization and/or demobilization. After reaching a remote site where a mobile source of electricity is required, the power generation transport and the air handling transport can be quickly converted from the transportation mode to the operation mode by, e.g., positioning and interconnecting the two transports, supplying hydrocarbon fuel to the gas turbine, and further making the required electrical interconnect. The gas turbine and the generator of the power generation transport may then be operated to generate electricity. After the mobile source of electricity is no longer required at the remote site, the mobile electric power generation system can be quickly mobilized to the transportation mode without use of any external mechanical equipment. In the operation mode, the power generation system may produce electric power in the range of about 5-60 megawatts (MW).

The mobile source of electricity may have different applications (e.g., industrial, mining, commercial, civilian, agricultural, manufacturing, and the like) where mobile electric power is needed and where the requisite hydrocarbon fuel (e.g., natural gas) required to power the gas turbine is available. As a specific non-limiting example, the system may power electric hydraulic fracturing operations for one or more well sites by providing electric power to a variety of fracturing equipment located at the well sites. The different fracturing equipment, which include, but are not limited to, a blender, hydration unit, fracturing pump transport(s), sand handling equipment, chemical additive system, and the mobile source of electricity, may be configured to operate remotely via a control network system that monitors and controls the fracturing equipment using a communication network.

Example Mobile Hydraulic Fracturing System

FIG. 1 is a schematic diagram of a mobile hydraulic fracturing system 103 that operates at a well site 100 and that includes a mobile source of electricity 102 to generate mobile electric power, in accordance with one or more embodiments. The well site 100 comprises a wellhead 111 (e.g., frac pad including multiple wells) and the mobile fracturing system 103 (e.g., hydraulic fracturing fleet, frac fleet or system). Generally, the mobile fracturing system 103 may perform fracturing operations to complete a well and/or transform a drilled well into a production well. For example, the well site 100 may be a site where operators are in the process of drilling and completing a well. Operators may start the well completion process (e.g., well completion operation) after drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and the mobile fracturing system 103 may be moved onto the well site 100 to perform the well completion operation (e.g., fracturing operation) that forces relatively high-pressure fracturing fluid through the wellhead 111 into subsurface geological formations to create fissures and cracks within the rock. The mobile fracturing system 103 may be moved off the well site 100 once the operators complete the well completion operation. Typically, the well completion operation for the well site 100 may last several days and even up to multiple months.

In some embodiments, the mobile fracturing system 103 may comprise a mobile source of electricity 102 (e.g., mobile electric power generation system) configured to generate electricity by converting hydrocarbon fuel, such as natural gas, obtained from one or more sources (e.g., a producing wellhead) at the well site 100, from a remote offsite location, and/or another relatively convenient location near the mobile source of electricity 102. That is, the mobile fracturing system 103 may utilize the mobile source of electricity 102 as a power source that burns cleaner while being transportable along with other fracturing equipment of the system 103. The generated electricity from the mobile source of electricity 102 may be supplied to fracturing equipment to power fracturing operations at one or more well sites, or to other equipment in several types of applications requiring mobile electric power generation.

In one or more embodiments, the mobile source of electricity 102 may be implemented as a two-trailer system including a power generation transport and an air handling transport. The power generation transport may comprise a turbine (e.g., gas turbine) and a generator, and the air handling transport may comprise an air inlet filter housing providing filtered combustion air for the turbine and filtered ventilation and cooling air for one or more components (e.g., the gas turbine, the lube oil radiator, and the like) housed in one or more compartments or enclosures of the power generation transport. The air handling transport may further include an exhaust stack that securely provides an exhaust system for exhaust air from the turbine as well as for exhausting ventilation and cooling air for one or more components (e.g., the gas turbine, the lube oil radiator, generator compartment, generator, electronic components, electrical components, and the like) housed in an enclosure of the power generation transport.

In one or more embodiments, the mobile source of electricity 102 may be implemented using a different number of transports. For example, the mobile source of electricity 102 may be implemented using a three-transport configuration in which the power generation transport includes the turbine and the generator, and the configuration further includes an air filter housing transport including the air inlet filter housing and an exhaust transport including the exhaust stack. The exhaust transport in such a design may be connected in the operation mode at the longitudinal facing side of the power generation transport via the exhaust connection and the air filter housing transport may be connected in the operation mode at the longitudinal facing side of the power generation transport via the intake connection.

Different configurations (dual-trailer, three-trailer, and the like) of the mobile source of electricity 102 are described in detail in U.S. Pat. No. 9,534,473, issued Jan. 3, 2017, to Jeffrey Morris et al and entitled "Mobile Electric Power Generation for Hydraulic Fracturing of Subsurface Geological Formations" (describing a dual-trailer configuration); and U.S. Pat. No. 11,725,582, issued Aug. 15, 2023, to Jeffrey Morris et al and entitled "Mobile Electric Power Generation System" (describing a three-trailer configuration), both of which is herein incorporated by reference in its entirety.

Although not shown in FIG. 1 (and as further illustrated in greater detail in FIGS. 2-11), the mobile source of electricity 102 may include a variety of equipment for mobile electric power generation including a gas conditioning skid, a black start generator, a power source (e.g., gas turbine), an air inlet filter housing, an intake connection, an inlet plenum, an exhaust collector, an exhaust connection, an exhaust stack, a gearbox, a generator shaft, a generator, electrical components, electronic components, one or more air inlet ports and one or more outlet ports on an enclosure of the power generation, a lube oil radiator, a generator breaker, a transformer, a starter motor, and a control system. Other components on the mobile source of electricity 102 may include a turbine lube oil system, a fire suppression system, a generator lube oil system, and the like.

In one embodiment, the power source may be a gas turbine. In another embodiment, power source may be another type of power source (e.g., reciprocating engine). The gas turbine may generate mechanical energy (e.g., rotation of a shaft) from a hydrocarbon fuel source, such as natural gas, liquefied natural gas, condensate, and/or other liquid fuels. For example, a shaft of the gas turbine may be connected to the gearbox and the generator such that the generator converts the supplied mechanical energy from the rotation of the shaft of the gas turbine to produce electric power. The gas turbine may be a commercially available gas turbine such as the Baker Hughes NovaLT™ family of gas turbines, the General Electric LM6000 gas turbine, the General Electric LM2500 family of gas turbines, the Pratt and Whitney FT8 gas turbine, or any other similar gas turbine that can generate the necessary amount of mechanical power for the generator. The generator may be a commercially available generator such as a Brush generator, a WEG generator, or other similar generator configured to generate a compatible amount of electric power. For example, the combination of the gas turbine, the gearbox, and the generator within the mobile source of electricity 102 may generate electric power from a range of at least about 1 megawatt (MW) to about 60 MW (e.g., 5.6 MW, 32 MW, or 48 MW). Other types of gas turbine/generator combinations with power ranges greater than about 60 MW or less than about 1 MW may also be used depending on the application requirement.

In addition to the mobile source of electricity 102, the mobile fracturing system 103 may include a switch gear transport 112, at least one blender transport 110, at least one data van 114, and one or more fracturing pump transports 108 that deliver fracturing fluid through the wellhead 111 to the subsurface geological formations. The switch gear transport 112 may receive electricity generated by the mobile source of electricity 102 via one or more electrical connections. In one embodiment, the switch gear transport 112 may use 13.8 kilovolts (KV) electrical connections to receive power from the mobile source of electricity 102. The switch gear transport 112 may transfer the electricity received from the mobile source of electricity 102 to electrically connected fracturing equipment of the mobile fracturing system 103. The switch gear transport 112 may comprise a plurality of electrical disconnect switches, fuses, transformers, and/or circuit protectors to protect the fracturing equipment. In some embodiments, switch gear transport 112 may be configured to step down a voltage received from the mobile source of electricity 102 to one or more lower voltages to power the fracturing equipment.

Each fracturing pump transport 108 may receive the electric power from the switch gear transport 112 to power a prime mover. The prime mover converts electric power to mechanical power for driving one or more fracturing pumps of the fracturing pump transport 108. In one embodiment, the prime mover may be a dual shaft electric motor that drives two different frac pumps mounted to each fracturing pump transport 108. Each fracturing pump transport 108 may be arranged such that one frac pump is coupled to opposite ends of the dual shaft electric motor and avoids coupling the pumps in series. By avoiding coupling the pump in series, fracturing pump transport 108 may continue to operate when either one of the pumps fails or has been removed from the fracturing pump transport 108. Additionally, repairs to the pumps may be performed without disconnecting the system manifolds that connect the fracturing pump transport 108 to other fracturing equipment within the mobile fracturing system 103 and the wellhead 111. The fracturing pump transport 108 may implement (in whole or in part) a system for predicting frac pump component life intervals and setting a continuous completion event for a well completion design.

The blender transport 110 may receive electric power fed through the switch gear transport 112 to power a plurality of electric blenders. In one or more embodiments, the blender transport 110 may function independently from the switch gear transport 112 and the mobile source of electricity 102 and be powered by other means such as a diesel engine or a natural gas reciprocating engine. A plurality of prime movers may drive one or more pumps that pump source fluid and blender additives (e.g., sand) into a blending tub, mix the source fluid and blender additives together to form fracturing fluid, and discharge the fracturing fluid to the fracturing pump transports 108. In one embodiment, the electric blender may be a dual configuration blender that comprises electric motors for the rotating machinery that are located on a single transport. In another embodiment, a plurality of enclosed mixer hoppers may be used to supply the proppants and additives into a plurality of blending tubs.

The data van 114 may be part of a control network system, where the data van 114 acts as a control center configured to monitor and provide operating instructions to remotely operate the mobile source of electricity 102, the fracturing pump transports 108, the blender transport 110, and/or other fracturing equipment within the mobile fracturing system 103. In one embodiment, the data van 114 may communicate with the variety of fracturing equipment using a control network system that has a ring topology (or star topology). A ring topology may reduce the amount of control cabling used for fracturing operations and increase the capacity and speed of data transfers and communication.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of the mobile fracturing system 103, one or more of the other fracturing equipment shown in FIG. 1 may be configured to receive power generated from the mobile source of electricity 102. The control network system for the mobile fracturing system 103 may remotely synchronize and/or slave the electric blender of the blender transport 110 with the electric motors of the fracturing pump transports 108.

Example Power Generation Transport

Figure 2:
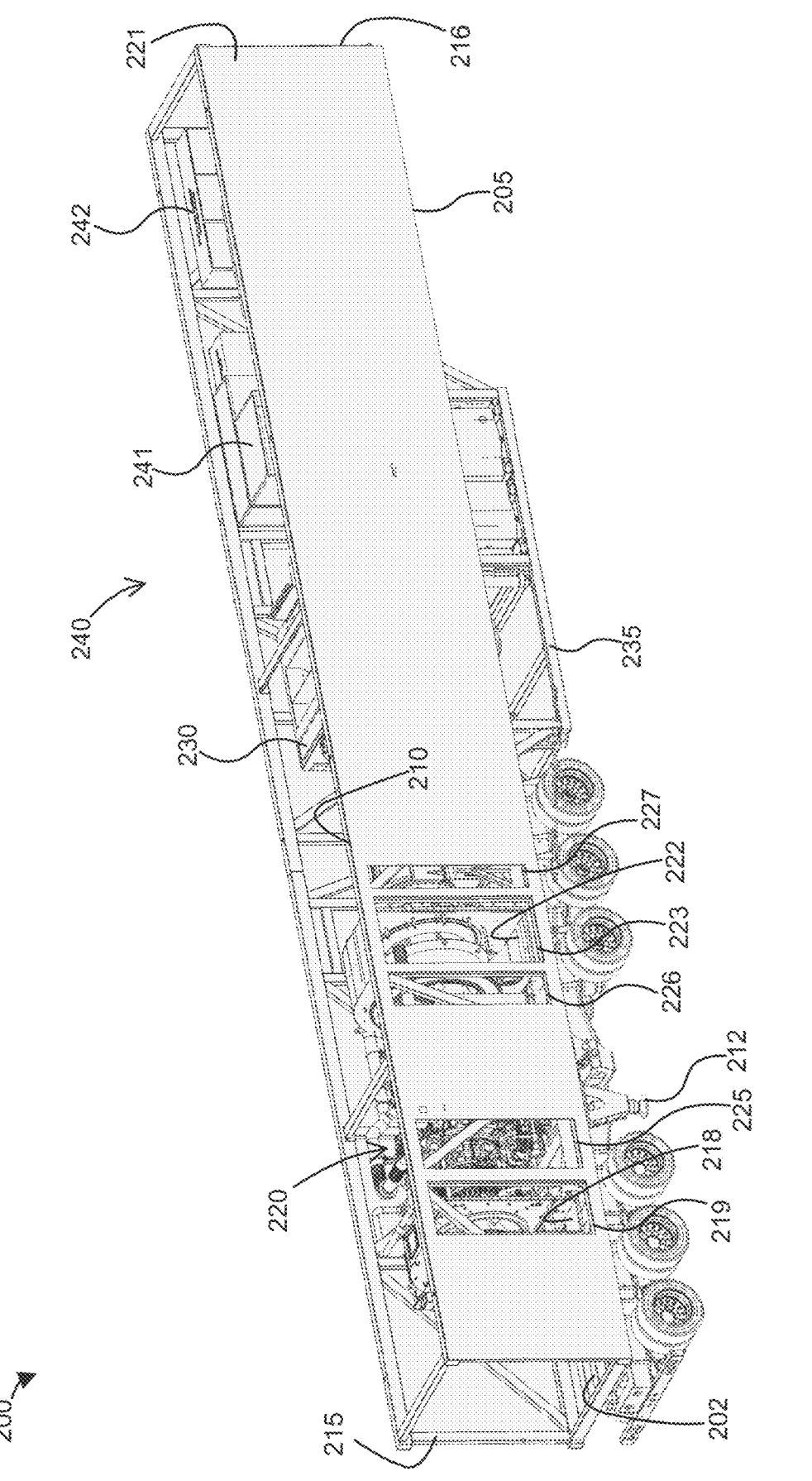
FIG. 2 is a schematic diagram showing a perspective view of a power generation transport, in accordance with one or more embodiments.
Figure 3:
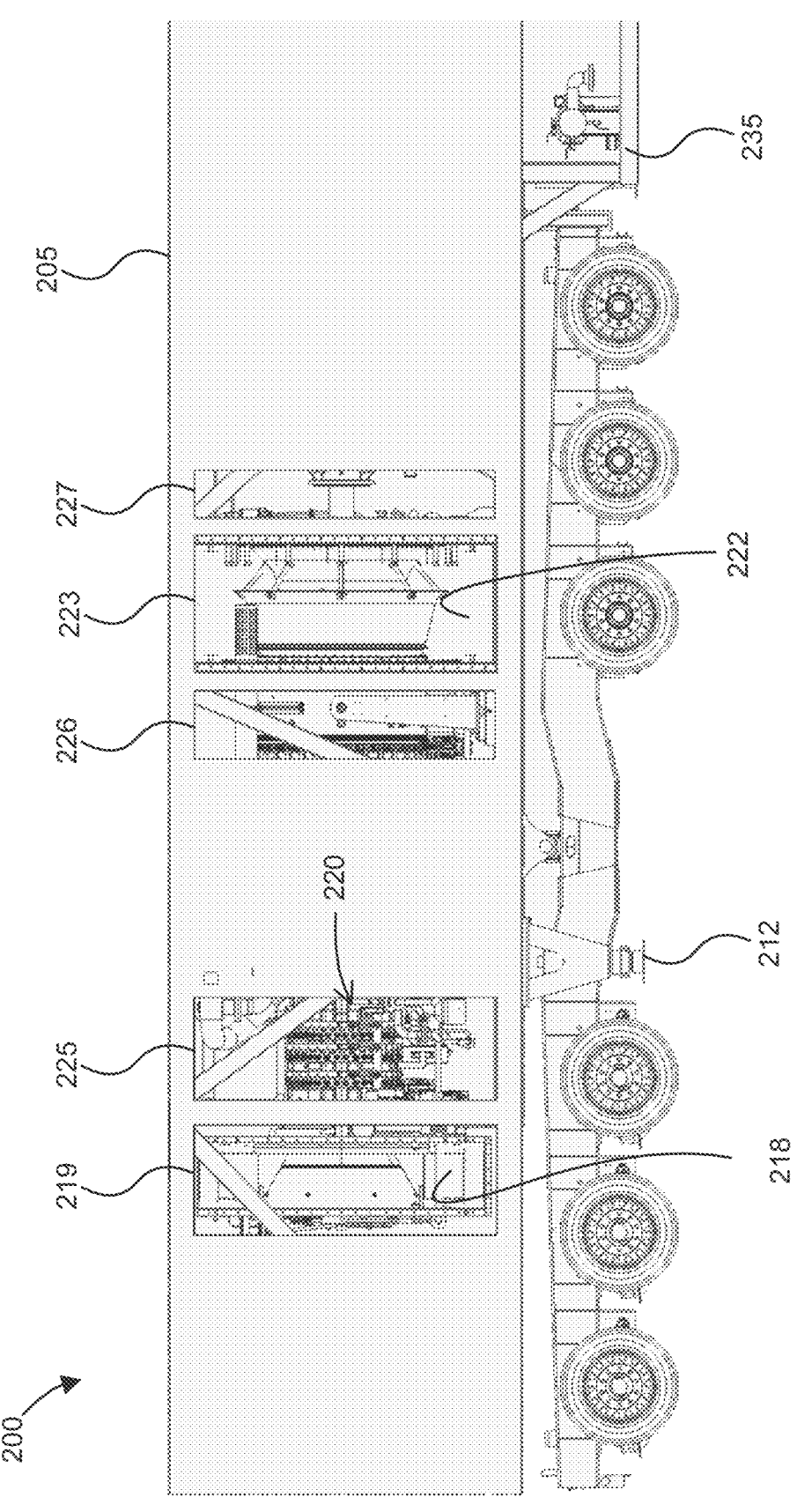
FIG. 3 is a schematic diagram showing a side view of a power generation transport, in accordance with one or more embodiments.

FIGS. 2 and 3 illustrate views of a power generation transport 200 including an enclosure 205 that surrounds and houses components within the power generation transport 200. In FIG. 2, the enclosure 205 is partially removed from the power generation transport 200 for visibility of the components mounted within. More specifically, in FIG. 2, the enclosure 205 is removed from the top side 210 and one of the end sides 215 of the power generation transport 200.

The power generation transport 200 may comprise components including a gas turbine 220 and a generator 230. An inlet plenum 218 (see FIGS. 9 and 11) may be connected to an intake of the gas turbine 220 and configured to intake filtered combustion air from a separate air inlet filter housing of a separate air handling transport and supply the filtered combustion air to the intake of the gas turbine 220. The inlet plenum 218 may be connected to an inlet port 219 disposed on an external surface of the enclosure 205 on a longitudinal side 221 (e.g., facing side) of the power generation transport 200 that is configured to face the separate air handling transport in an operation mode.

The gas turbine 220 generates mechanical energy (i.e., rotation of a shaft) from a hydrocarbon fuel source, such as natural gas, liquefied natural gas, condensate, and/or other liquid fuels. The gas turbine 220 shaft is connected to the generator 230 (see, e.g., FIGS. 9-11) such that the generator 230 converts the supplied mechanical energy from the rotation of the shaft to produce electric power.

An exhaust collector (e.g., exhaust plenum) 222 (see, e.g., FIGS. 9-11) may be connected to an exhaust of the gas turbine 220 and configured to collect exhaust air discharged from the gas turbine 220 and supply the exhaust air to a separate exhaust stack of the separate air handling transport. The exhaust collector 222 may be connected to an outlet port 223 disposed on the external surface of the enclosure 205 on the longitudinal side 221 of the power generation transport 200.

To improve mobility of the power generation transport 200, the inlet port 219 connected to the inlet plenum 218 and the outlet port 223 connected to the exhaust collector 222 are provided on the longitudinal side 221 of the power generation transport 200.

FIGS. 2 and 3 also show an inlet port 225 disposed on the external surface of the enclosure 205 on the longitudinal side 221 of the power generation transport 200. The inlet port 225 is adjacent to the inlet port 219 for the inlet plenum 218. The inlet port 225 is adapted to connect with and intake filtered ventilation and cooling air from the separate air handling transport for ventilating an interior of the enclosure 205 of the power generation transport 200, and for cooling heat radiated from the gas turbine 220 during the operation mode. For example, a compartment that is within the enclosure 205 and that includes the gas turbine 220 may receive the filtered cooling air from the inlet port 225 to cool heat radiated by the gas turbine 220 during operation. The compartment may include additional components that also radiate heat and that are also cooled by the cooling air flowing into and through the compartment from the inlet port 225. For example, the additional components may include components of a lube oil cooling system (discussed later) such as one or more lube oil radiators. The filtered ventilation and cooling air entering the enclosure 205 from the separate air handling transport via the intake port 225 flows into and ventilates the interior of the enclosure 205 and collects the radiant heat of components (e.g., the gas turbine 220, the lube oil radiator, and the like) and exits out from the outlet port 226 disposed on the external surface of the enclosure 205 on the longitudinal side 221 of the power generation transport 200. The outlet port 226 is disposed adjacent the outlet port 223 connected to the exhaust collector 222.

FIGS. 2 and 3 further show an outlet port 227 for exhausting (heated) cooling air for cooling and ventilating a generator compartment 240 of the power generation transport 200 that houses a plurality of components including the generator 230. One or more intake louver ports 204 (see FIG. 9) may be disposed on an external surface of an end side 216 that is perpendicular to the longitudinal side 221 of the enclosure 205 of the power generation transport 200 and/or on the longitudinal side 221 and/or on the longitudinal side that is opposite to the longitudinal side 221 of the enclosure 205 and the louver ports 204 may draw in ambient air for cooling the generator compartment 240. In addition to the generator 230, the generator compartment 240 may include electronic and/or electrical components such as a generator breaker 241, a transformer, control cabinets including variable frequency drives (VFDs), a control system 242, a control room, and a generator shaft.

The generator breaker 241 and the control system 242 may be located on the power generation transport 200 inside the generator compartment 240. The generator breaker 241 may comprise one or more circuit breakers that are configured to protect the generator 230 from current and/or voltage fault conditions. The generator breaker 241 may be a medium voltage (MV) circuit breaker switchboard. In one or more embodiments, the generator breaker may be about three panels, two for the generator and one for a feeder that protect relays on the circuit breaker. In one or more embodiments, the generator breaker 241 may be a vacuum circuit breaker. The control system 242 may be configured to control, monitor, regulate, and adjust the power output of the gas turbine 220 and the generator 230. For example, the control system 242 may monitor and balance the load produced by fracturing operations by generating enough electric power to match the load demands. The control system 242 may also be configured to synchronize and communicate with a control network system that allows a data van or other computing systems located in a remote location (e.g., off the well site) to control, monitor, regulate, and adjust power output of the generator 230. Although the figures illustrate that the generator breaker 241 and/or control system 242 may be mounted on the power generation transport 200, other embodiments of the mobile source of electricity 102 may mount the generator breaker 241 and/or the control system 242 in other locations (e.g., the switch gear transport 112).

The intake louver ports 204 may include a filter bank 206 of one or more filters (FIG. 9) to filter ambient air before the air flows into the generator compartment of the enclosure 205. The generator compartment 240 may also include air ventilation fans (not shown) internal to the generator 230 that draw air into the intake louver ports 204 and cause the air to flow through the filter bank 206 and through a length of the generator compartment 240 to thereby collect radiant heat from the electronic and/or electrical components housed in the generator compartment 240 (e.g., heat from the generator breaker 241, the control system 242, and the like). The (heated) air also flows into and through ports located on one or more sides of the generator 230 (e.g., top side, bottom side, front side, back side), collecting the radiant heat from the generator 230 and thereby cooling the generator 230. The heated air may then flow out of the outlet port 227 disposed on the external surface of the enclosure 205 on the longitudinal side 221 of the power generation transport 200. The outlet port 227 may be connected to a separate exhaust stack mounted on a separate air handling transport. Such a configuration for the ventilation and cooling air flow path for the generator compartment 240 results in reduced noise because the generator compartment cooling air is discharged from the top of the exhaust stack (e.g., at 20-30 feet high).

To improve mobility over a variety of roadways, the power generation transport 200 may have a maximum height of about 13 feet and 6 inches, a maximum width of about 8 feet and 6 inches, and a maximum length of about 70 feet. Further, the power generation transport 200 may comprise at least three axles used to support and distribute the weight on the power generation transport 200. Other embodiments of the power generation transport 200 may be transports that exceed three axles depending on the total transport weight.

The dimensions and the number of axles may be adjusted to allow for the transport 200 to be able to navigate over roadways that typically mandate certain height, length, and weight restrictions.

In one embodiment, the gas turbine 220, the generator 230 and the other components of the power generation transport 200 may be mounted to an engineered transport frame 202, a sub-base, sub-skid, or any other sub-structure used to support the mounting of the components. The engineered transport frame 202 may be used to align the connections between the gas turbine 220, the generator 230, the inlet plenum 218 and the exhaust collector 222 and/or lower the gas turbine 220 and the generator 230 by configuring for a flush mount to the engineered transport frame 202. The engineered transport frame 202 may allow for easier alignment and connection of the gas turbine 220 and the generator 230 compared to using separate sub-base for the gas turbine 220 and the generator 230. Other embodiments of the power generation transport 200 may use a plurality of sub-bases, for example, mounting the gas turbine 220 on one sub-base and mounting the generator 230 on another sub-base.

Figure 4:
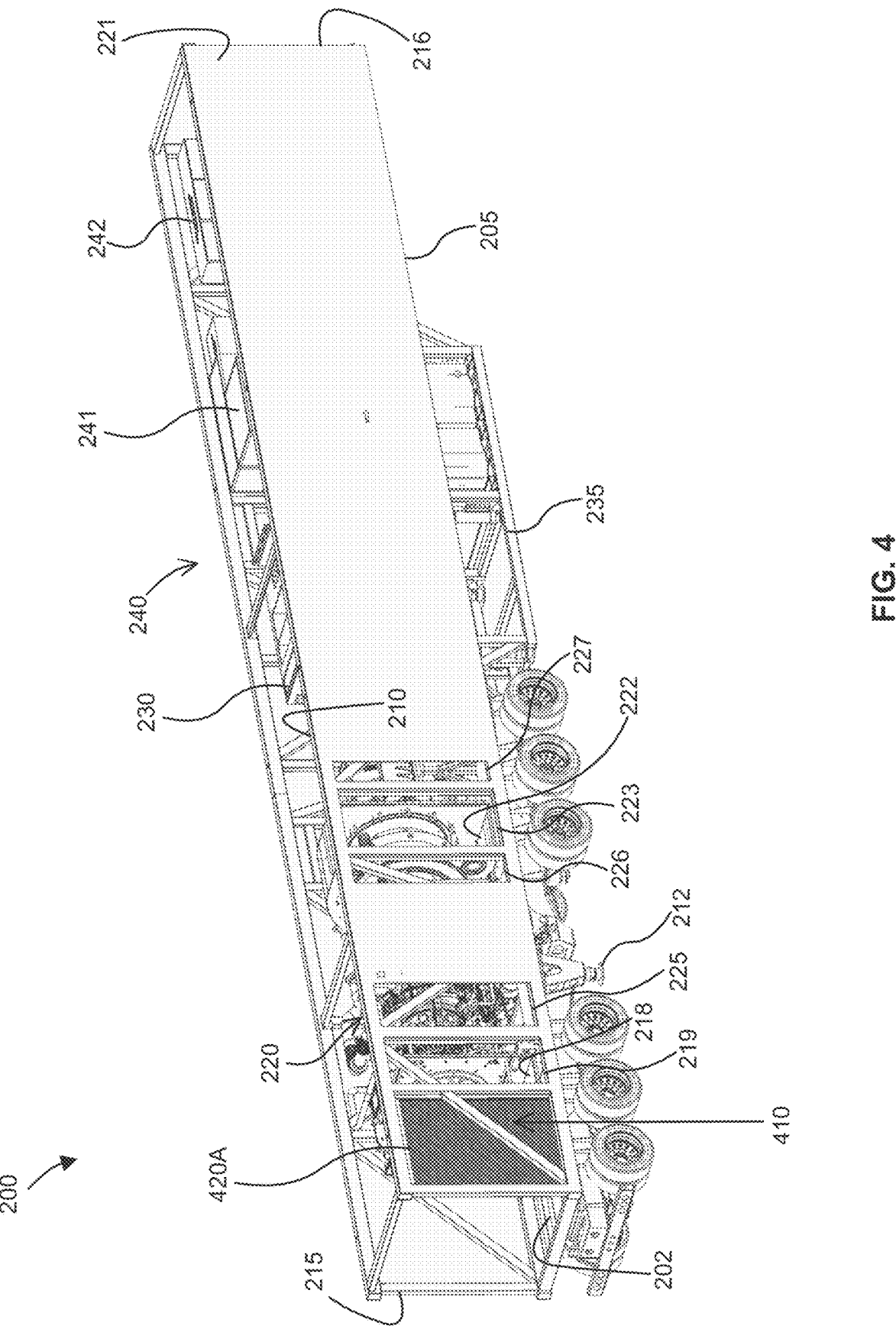
FIG. 4 is a schematic diagram showing a perspective view of a power generation transport, in accordance with one or more embodiments.

FIG. 4 shows an embodiment of a power generation transport 200 that further includes a lube oil radiator 410 and an inlet port 420A disposed on the external surface of the enclosure 205 on the longitudinal side 221 of the power generation transport 200. The inlet port 420A is disposed adjacent to the inlet ports 219 and 225 on the longitudinal side 221. In one or more embodiments, a lube oil cooling system may include a plurality of the lube oil radiators 410 including a lube oil radiator 410 mounted on the longitudinal side 221 in the inlet port 420A and another lube oil radiator 410 mounted in inlet port 420B on the longitudinal side that is opposite to the longitudinal side 221 of the power generation transport 200 (see, e.g., FIGS. 7, 10).

In one or more embodiments, the lube oil cooling system may further include an exhaust fan 422 mounted in an exhaust port 423 (see, e.g., FIGS. 7-11) disposed on top side 210 of the enclosure 205 of the power generation transport 200. The exhaust fan 422 may draw in ambient air from the inlet ports 420A-B and into a compartment of the enclosure 205 that includes the lube oil radiators 410. Each lube oil radiator 410 may be a radiator (e.g., one or more heat exchanger coils) for cooling gas turbine lube oil and/or generator lube oil that is stored in lube oil tanks (not shown) disposed in underbelly truss 235. The ambient air may flow through the lube oil radiators 410 in the inlet ports 420A, 420B while hot lube oil is circulated in finned metal tubes of the lube oil radiators 410 to cool the lube oil. The ambient air may collect the radiant heat from the finned metal tubes of the lube oil radiators 410 and the heated air may flow out from the exhaust port 423 in the top side 210 of the enclosure 205 of the power generation transport 200.

In one or more embodiments, the inlet port 420A may be adapted to connect with and intake filtered ventilation and cooling air from the separate air handling transport for collecting the radiant heat from the corresponding lube oil radiator 410 and cooling the lube oil. The inlet port 420A may be disposed adjacent to the inlet plenum 218. The arrangement order of the inlet ports 420A, 219, and 225 in FIG. 4 is exemplary in nature only and not intended to be limiting. In one or more embodiments, the inlet ports 420A, 219, and 225 may be arranged in a different order.

In one or more embodiments, the lube oil radiators 410 may be disposed in the same compartment as the gas turbine 220, and the cooling air that flows in from the inlet ports 420A and/or 420B and that has picked up the radiant heat from the lube oil radiators 410 may combine with the cooling air that flows in from the inlet port 225 for cooling the radiant heat of the gas turbine 220, and the combined cooling air heated by picking up the radiant heat from the gas turbine 220 and the lube oil radiators 410 may exhaust out of the outlet port 226.

In one or more embodiments, the lube oil radiators 410 may be disposed in a compartment that is separate from the compartment where the gas turbine 220 is disposed, and the cooling air that flows in from the inlet ports 420A-B and that has picked up the radiant heat from the lube oil radiators 410 may flow out from the exhaust port 423 mounted on the top side 210 of the enclosure 205 of the power generation transport 200.

Other equipment that may also be located on the power generation transport 200 but are not shown in the drawings include gas fuel valves and fire suppression system. The lube oil systems or consoles, which refer to both the turbine lube oil system and generator lube oil system within this disclosure, may be configured to provide a generator and turbine lube oil filtering and cooling systems. In one embodiment, the turbine lube oil console area of the transport may also contain the fire suppression system, which may comprise sprinklers, water mist, clean agent, foam sprinkler, carbon dioxide, and/or other equipment used to suppress a fire or provide fire protection for the gas turbine 220. The mounting of the turbine lube oil consoles and the fire suppression system onto the power generation transport 200 reduces this transport's footprint by eliminating the need for an auxiliary transport and connections for the turbine and generator lube oil, filtering, cooling systems and the fire suppression system to the gas turbine generator transport. The turbine and generator lube oil systems may be mounted on a skid 235 that is located underneath the generator 230 or any other location on the power generation transport 200.

Example Air Handling Transport

Figure 5:
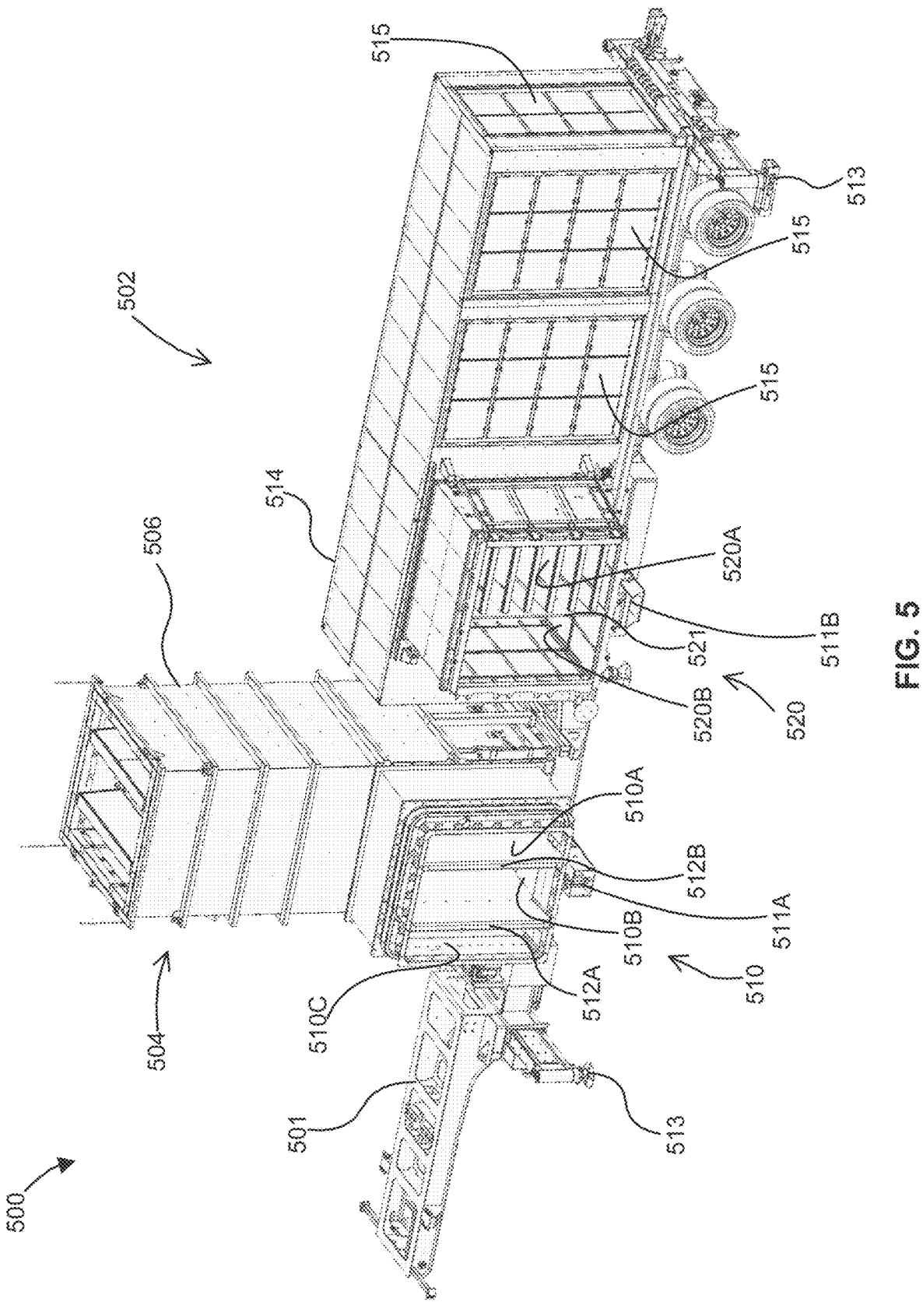
FIG. 5 is a schematic diagram showing a perspective view of an air handling transport in an operation mode, in accordance with one or more embodiments.
Figure 6:
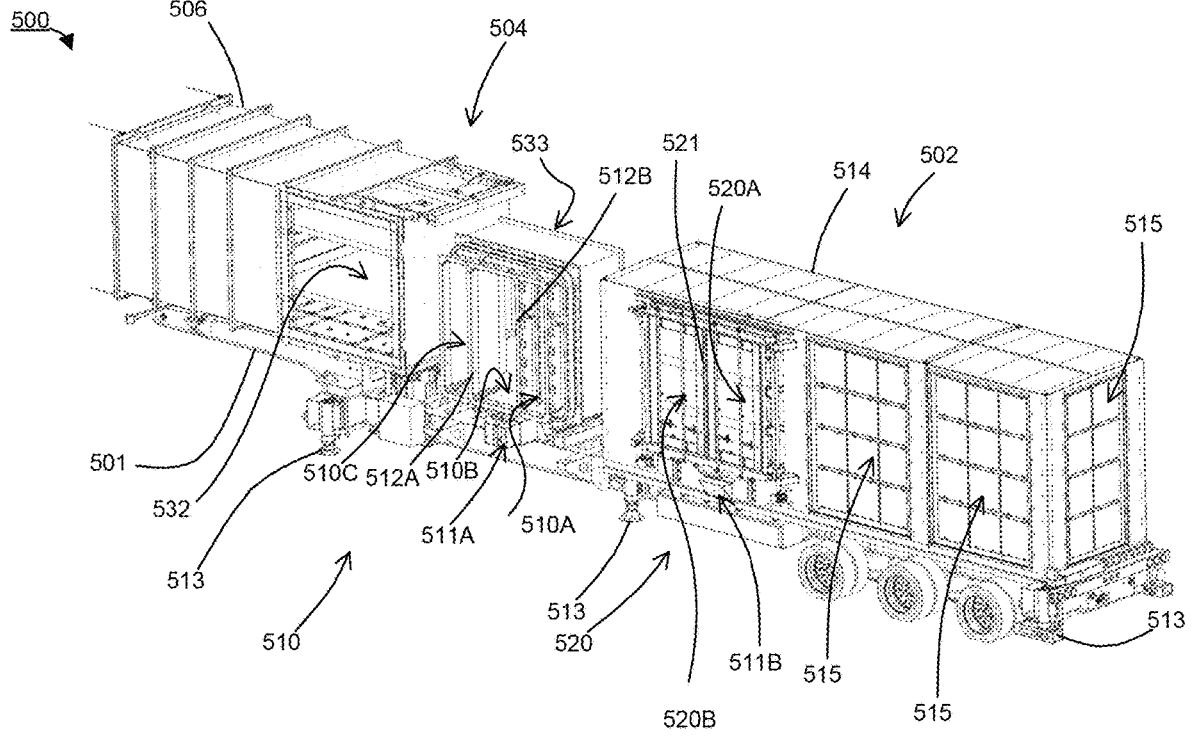
FIG. 6 is a schematic diagram showing a perspective view of an air handling transport in a transportation mode, in accordance with one or more embodiments.

FIG. 5 is a schematic diagram showing a perspective view of an air handling transport 500 in an operation mode, in accordance with one or more embodiments. FIG. 6 is a schematic diagram showing a perspective view of an air handling transport 500 in a transportation mode, in accordance with one or more embodiments. As shown in FIGS. 5 and 6, the air handling transport 500 includes a base frame 501, and an air inlet filter housing 502 and an exhaust stack 504 mounted on the base frame 501.

FIGS. 5 and 6 illustrate that the air inlet filter housing 502 may be mounted on the air handling transport 500 at a fixed location. In one or more embodiments, the air handling transport 500 may mount the air inlet filter housing 502 with a configuration such that the air inlet filter housing 502 may slide in one or more directions when transitioning between the operation mode and the transportation mode. The air inlet filter housing 502 may include a plurality of silencers that reduce noise. The configuration including the dimensions, the number of filters and number of silencers of the air inlet filter housing 502 may depend on the amount of clean air and the air flow dynamics needed to supply the filtered air for combustion, ventilation, and cooling, to the power generation transport 200.

The exhaust stack 504 may comprise an exhaust passage 506 configured for noise control and an exhaust connection 510. The exhaust passage 506 may comprise a plurality of silencers or baffles disposed in an exhaust air flow path. The plurality of silencers or baffles are configured to reduce noise of the exhaust air as it exits the equipment through the top of the exhaust passage 506. The exhaust stack 504 is movable between first and second positions such that in the first position, the exhaust passage 506 is lowered on the air handling transport 500 as shown in FIG. 6, and in the second position, the exhaust passage 506 is raised on the air handling transport 500 and pointing the exhaust passage vertically (e.g. 90 degrees; FIG. 5).

That is, as shown in FIG. 6, the exhaust passage 506 may be mounted to initially lie on its side (e.g., 180 degrees) on the base frame 501 during the transportation mode. In the operation mode, as shown in FIG. 5, the exhaust passage 506 may be rotated up without using mechanical equipment external to the air handling transport 500. The exhaust passage 506 may be connected to the base frame 501 via a connecting member (e.g., hinge), and in the operation mode, the exhaust passage 506 may be positioned vertically using an actuation mechanism (e.g., hydraulics, pneumatics, and/or electric motor) and the exhaust connection 510 may be adjustable to accommodate and align with the exhaust passage 506 to create an exhaust flow path. The exhaust passage 506 may be movable from the first (horizontal; transportation) position to the second (vertical, upright; operation) position, and/or from the second position to the first position using hydraulics (e.g., a hydraulic system), pneumatics, and/or electric motors such that in the second position, the exhaust passage 506 aligns and connects with the exhaust connection 510.

The exhaust connection 510 may be adjustable to accommodate and align the exhaust passage 506 at a downstream end and align and connect with the outlet ports 226, 223, and 227 of the power generation transport 200 at an upstream end. That is, the exhaust connection 510 may move in a direction toward the enclosure 205 of the power generation transport 200 during the transition from the transportation mode of FIG. 6 to the operation mode of FIG. 5 and the exhaust passage 506 may be moved from the horizontal position of FIG. 6 to the vertical position of FIG. 5, so that downstream end 533 of the exhaust connection 510 moved outward toward the power generation transport 200 can align and connect with opening 532 of the exhaust passage 506.

In one or more embodiments, the air handling transport 500 may be equipped with outriggers 511A that are operable using one or more of hydraulics, pneumatics, electric motors, and/or mechanical components, and the outriggers 511A may be actuated in the operation mode to cause the exhaust connection 510 to move forward in a side direction from a transportation position shown in FIG. 6 to an operation position shown in FIG. 5. That is, the outriggers 511A may cause the exhaust connection 510 to move in a direction toward the enclosure 205 of the power generation transport 200 when the power generation transport 200 and the air handling transport 500 are parked next to each other during the transition to the operation mode. Conversely, when transitioning from the operation mode to the transportation mode, the outriggers 511A may cause the exhaust connection 510 to move backward in the side direction, which is in the direction away from the power generation transport 200. Other embodiments of the exhaust stack 504 may have the exhaust passage 506 and the exhaust connection 510 connected as a single component such that the exhaust connection 510 and the exhaust passage 506 are rotated together when transitioning between the transportation mode and the operation mode, and the outriggers 511A move the single component toward the power generation transport 200 during the transition to the operation mode.

In one or more embodiments, to more finely adjust the positioning, alignment, and distance to connect the two transports 200 and 500, one or both transports 200 and 500 may include a hydraulic walking system. For example, the hydraulic walking system may move and align the air handling transport 500 into a position without attaching the two transports 200 and 500 to transportation vehicles (e.g., a tractor or other type of motor vehicle). Using FIGS. 2-4 as an example, the hydraulic walking system may comprise a plurality of outriggers and/or support feet 212 used to move the power generation transport 200 back and forth, up and down, and/or sideways. Using FIGS. 5 and 6 as an example, the hydraulic walking system may also comprise a plurality of outriggers and/or support feet 513 used to move the air handling transport 500 back and forth, up and down, and/or sideways. At each outrigger and/or support feet 212, 513, the hydraulic walking system may comprise a first hydraulic cylinder that lifts the transport and a second hydraulic cylinder that moves the transport in the designated orientation or direction. A hydraulic walking system on the transport increases mobility by reducing the precision needed when parking the two transports next to each other.

As shown in FIGS. 5 and 6, the exhaust connection 510 may include partitions 512A and 512B to divide the exhaust connection 510 into compartments 510A, 510B, and 510C. The three compartments defined by the partitions 512A-B partitioning the distal end of the exhaust connection 510 may be adapted to be respectively sealed and mated with the outlet ports 226, 223, and 227 on the external surface of the enclosure 205 of the power generation transport 200 during the operation mode. Any form of connection may be used that provides the coupling between the compartments 510A, 510B, and 510C and the outlet ports 226, 223, 227 without using a crane, forklift, and/or any other external mechanical means to make the connection.

In one or more embodiments, the connection may be a flange connection, and the outriggers 511A and/or the hydraulic walking system (e.g., feet 212 and/or 513) may be operated to cause the compartments 510A, 510B, and 510C to be flanged up, sealed and mated with the outlet ports 226, 223, and 227 in the operation mode.

In one or more embodiments, the connection may be an inductor connection, and the outriggers 511A and/or the hydraulic walking system (e.g., feet 212 and/or 513) may be operated to cause compartments 510A, 510B, and 510C of the exhaust connection 510 to stab and seal into the outlet ports 226, 223, and 227 of the power generation transport 200 without having to precisely flange up the compartments 510A, 510B, and 510C of the exhaust connection 510 with the outlet ports 226, 223, and 227 of the power generation transport 200.

The exhaust connection 510 and the partitions 512A-B of the exhaust connection 510 engage with corresponding outlet ports 226, 223, and 227 such that exhaust air discharged from one of the outlet ports 226, 223, and 227 and respectively entering the compartments 510A, 510B, and 510C does not back feed into another one of the outlet ports 226, 223, and 227, and instead, all exhaust air flows in one direction toward the exhaust passage 506 and out from the top of the exhaust passage 506 into the atmosphere, despite any pressure difference between the air flows in the three compartments. The exhaust air entering the exhaust connection compartments 510A-C from the outlet ports 226, 223, and 227 respectively may initially be partitioned by the partitions 512A-B, and subsequently be combine into a single exhaust air flow downstream as the air enters the opening 532 of the exhaust passage 506 from the downstream end 533 of the exhaust connection 510.

The air inlet filter housing 502 includes an air box 514 mounted on the base frame 501 of the air handling transport 500, and an intake connection 520. The air box 514 may include one or more air inlets and one or more air filters 515 that are mounted along one or more interior end or side surfaces of the air box 514 to intake ambient air from the one or more air inlets and filter the air. The filtered air from the air box 514 may be discharged from the intake connection 520 as combustion air or ventilation and cooling air.

The intake connection 520 of the air inlet filter housing 502 may include a partition 521 to divide the intake connection 520 into compartments 520A and 520B. The compartments 520A and 520B defined by the partition 521 at the distal end of the intake connection 520 may be adapted to be respectively sealed and mated with the inlet ports 219 and 225 on the external surface of the enclosure 205 of the power generation transport 200 during the operation mode.

In one or more embodiments, the intake connection 520 of the air inlet filter housing 502 may include two partitions (not shown) to divide the intake connection 520 into three compartments. The three compartments defined by the partitions partitioning the distal end of the intake connection 520 may be adapted to be respectively sealed and mated with the inlet ports 420A, 219 and 225 on the external surface of the enclosure 205 of the power generation transport 200 of FIG. 4 during the operation mode.

In one or more embodiments, the air handling transport 500 may be equipped with outriggers 511B that are operable using one or more of hydraulics, pneumatics, electric motors, and/or mechanical components, and the outriggers 511B may be actuated in the operation mode to cause the intake connection 520 to move forward in a side direction from a transportation position shown in FIG. 6 to an operation position shown in FIG. 5. That is, the outriggers 511B may cause the intake connection 520 to move in a direction toward the enclosure 205 of the power generation transport 200 when the power generation transport 200 and the air handling transport 500 are parked next to each other during the transition to the operation mode. Conversely, when transitioning from the operation mode to the transportation mode, the outriggers 511B may cause the exhaust connection 520 to move backward in the side direction, which is in the direction away from the power generation transport 200.

Any form of connection may be used that provides coupling between the intake connection 520 and the intake ports 219 and 225 (or 420A, 219 and 225) without using a crane, forklift, and/or any other external mechanical means to make the connection.

In one or more embodiments, the connection may be a flange connection, and the outriggers 511B and/or the hydraulic walking system (e.g., feet 212 and/or 513) may be operated to cause the compartments 520A, 520B to be flanged up, sealed and mated with the intake ports 219 and 225 (or 420A, 219 and 225) in the operation mode.

In one or more embodiments, the connection may be an inductor connection, and the outriggers 511B and/or the hydraulic walking system (e.g., feet 212 and/or 513) may be operated to cause compartments 520A, 520B of the intake connection 520 to stab and seal into the intake ports 219 and 225 of the power generation transport 200 without having to precisely flange up the compartments 520A, 520B of the intake connection 520 with the intake ports 219 and 225 of the power generation transport 200.

The filtered air entering the intake connection 520 from the air box 514 may initially be a combined flow of filtered air. As the filtered air enters the compartments 520A and 520B of the intake connection 520, the air flow may be partitioned into a combustion air flow flowing out of the compartment 520A and flowing into the inlet port 219 connected to the inlet plenum 218 of the gas turbine 220 on the power generation transport 200, and a ventilation and cooling air flow flowing out of the compartment 520B and flowing into the inlet port 225 connected to the compartment of the gas turbine 220 to ventilate the compartment and collect the radiant heat. Combustion air may be air that is supplied to the gas turbine 220 to aid in production of mechanical energy.

The compartment 520A thus channels (e.g., via suction) a first portion of the filtered air from the air inlet filter housing 502 to the intake of gas turbine 220 on the power generation transport 200 via the inlet port 219 for combustion. And the compartment 520B channels (e.g., via forced fan air) a second portion of the filtered air as cooling air to cool an enclosure of the gas turbine 220 via the inlet port 225.

The combustion air flowing out of the compartment 520A may be drawn into the inlet port 219 of the power generation transport 200 during the operation mode by the operation of the gas turbine 220 blades creating a suction force causing the ambient air to be filtered by the filters 515 of the air box 514 and drawn into the inlet port 219. Although not shown in FIGS. 5 and 6, one or more inlet filters and ventilation fans may be located within or housed in the air inlet filter housing 502. For example, to cause the ventilation and cooling air to flow into the compartment of the enclosure 205 housing the gas turbine 220, the compartment 520B of the intake connection 520 may include one or more fans that cause the ambient air to be filtered by the air box 514 and flow into the port 225 as forced filtered air for ventilation and cooling.

In one or more embodiments, the air box 514 may include a plurality of sections respectively corresponding to the compartments 520A and 520B for the combustion air and the ventilation and cooling air.

Although not specifically shown in the figures, the air inlets, and filters 515 may be mounted on the air box 514 as one or more two-dimensional grids or arrays of filters. The arrangement of air inlet filter housing 502 on the air handling transport 500 or the number and arrangement of the air inlets and filters 515 of the air box 514 is not intended to be limiting. Any number or arrangement of inlets and filters 515 of the air box 514 may be employed depending on, e.g., the amount or volume of clean air and the air flow dynamics needed to supply adequate amount of fresh combustion air to the gas turbine 220 of the power generation transport 200 and to supply adequate amount of fresh ventilation and cooling air to the compartment housing the gas turbine 220 of the power generation transport 200.

Although not shown in the figures, the air inlet filter housing 502 may be covered with air inlet filter housing doors (e.g., weather hoods, tent doors, louvers, and the like) to cover the air inlets and filters from the elements when the air handling transport 500 is in the transportation mode. The doors may be coupled to the air box 514 by a coupling member (e.g., hinge) and may be controlled by an actuating system to be pivotable between a closed position during the transportation mode and an open position during the operation mode. In some embodiments, the doors may be pivotable between the closed and open positions manually. In case the air handling transport 500 is equipped with an actuating system, any suitable mechanism may be employed to mechanically actuate one or more of the doors between the open and closed positions. For example, the actuating system may be implemented using a hydraulic system, an electric motor, a rack-and-pinion system, a pneumatic system, a pulley-based system, and the like. In the open position during the operation mode, the doors may remain open to allow the ambient air to easily enter the air inlet filter housing 502. During the operation mode, the doors may also function as a roof that protects the filters of the air box 514 from environmental elements like sun, rain, snow, dust and the like. In the closed position during the transportation mode, the doors may be controlled by the actuating system to be closed to prevent damage to the air inlet filters during transportation and provide increased aerodynamics and enhanced mobility of the air handling transport 500 over a variety of roadways.

The routing of the air for the air inlet filter housing 502 and exhaust stack 504 via the side of the air handling transport 500 may provide a complete aerodynamic modeling where the inlet air flow and the exhaust air flow are used to achieve the gas turbine nameplate output rating.

FIGS. 5 and 6 show a configuration of the air handling transport 500 in which the air inlet filter housing 502 and the exhaust stack 504 are mounted on the same trailer. This is not intended to be limiting. In one or more embodiments, the air inlet filter housing 502 may be mounted on a base frame of a first transport and the exhaust stack 504 may be mounted on a base frame of a second transport that is separate from the first transport and that is independently movable relative to the first transport.

Figure 7:
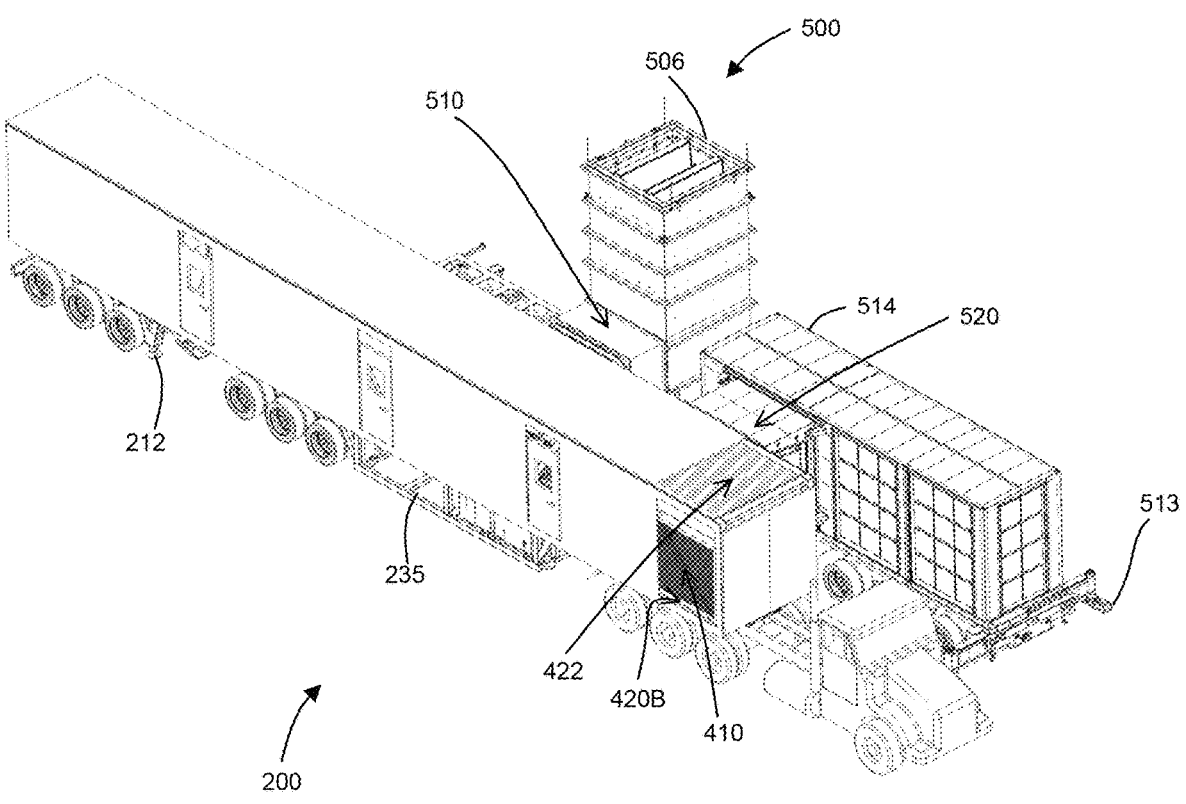
FIG. 7 is a schematic diagram showing a perspective view of a mobile source of electricity in an operation mode, in accordance with one or more embodiments.
Figure 8:
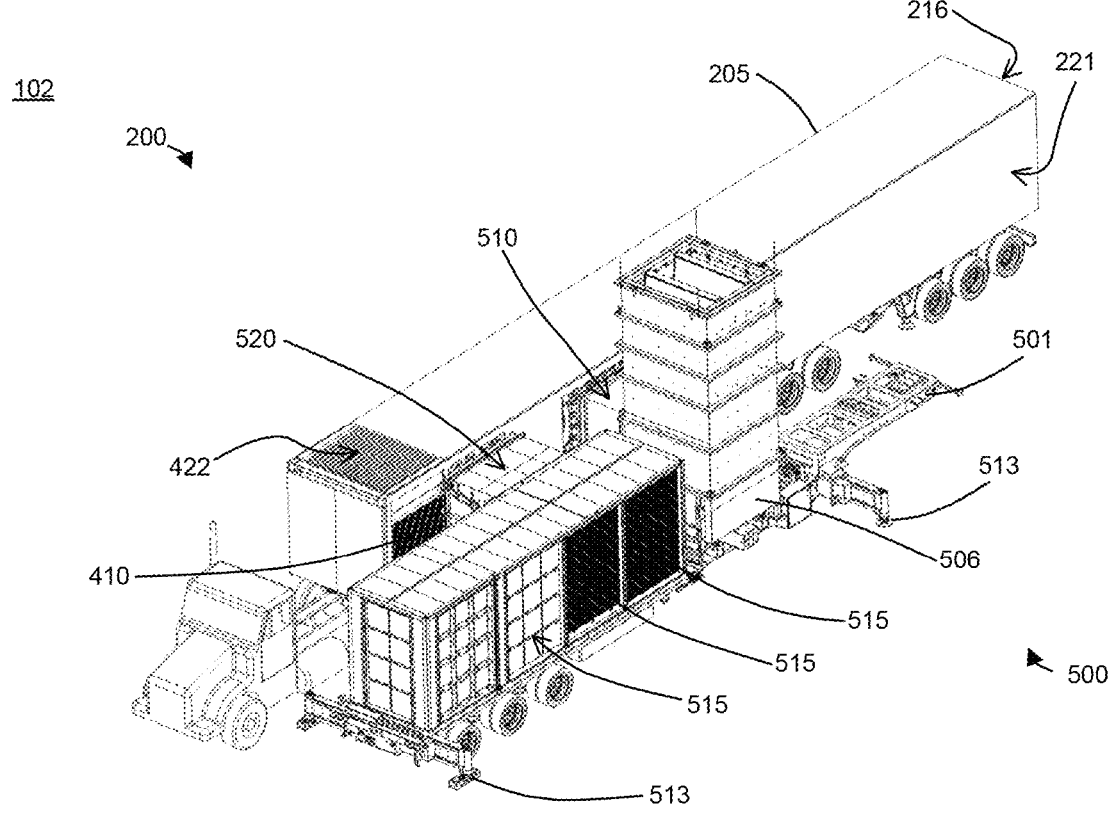
FIG. 8 is a schematic diagram showing another perspective view of a mobile source of electricity in an operation mode, in accordance with one or more embodiments.
Figure 9:
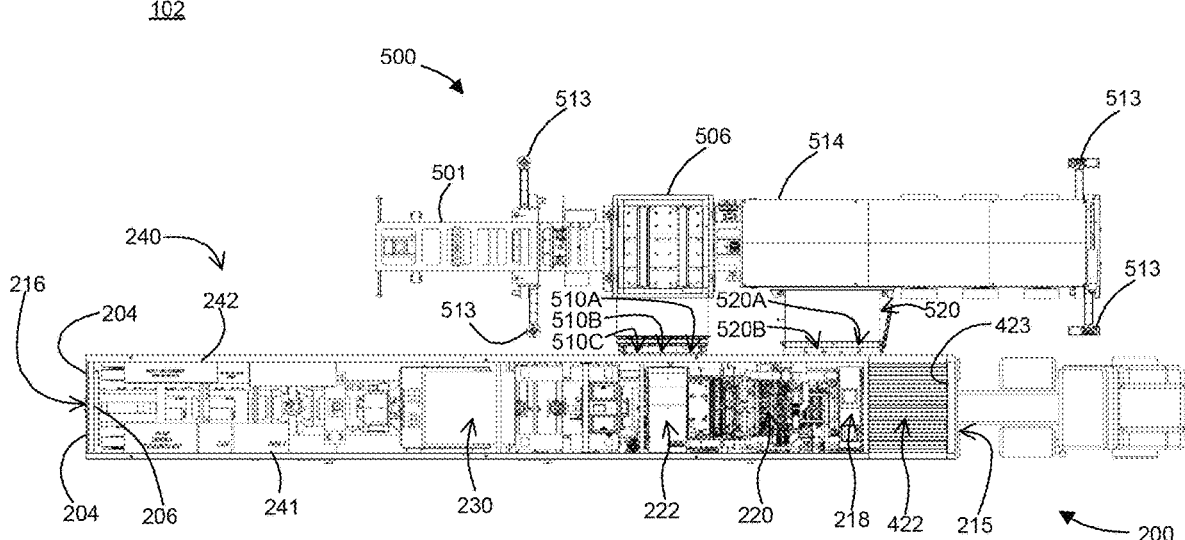
FIG. 9 is a schematic diagram showing a plan view of a mobile source of electricity in an operation mode, in accordance with one or more embodiments.
Figure 10:
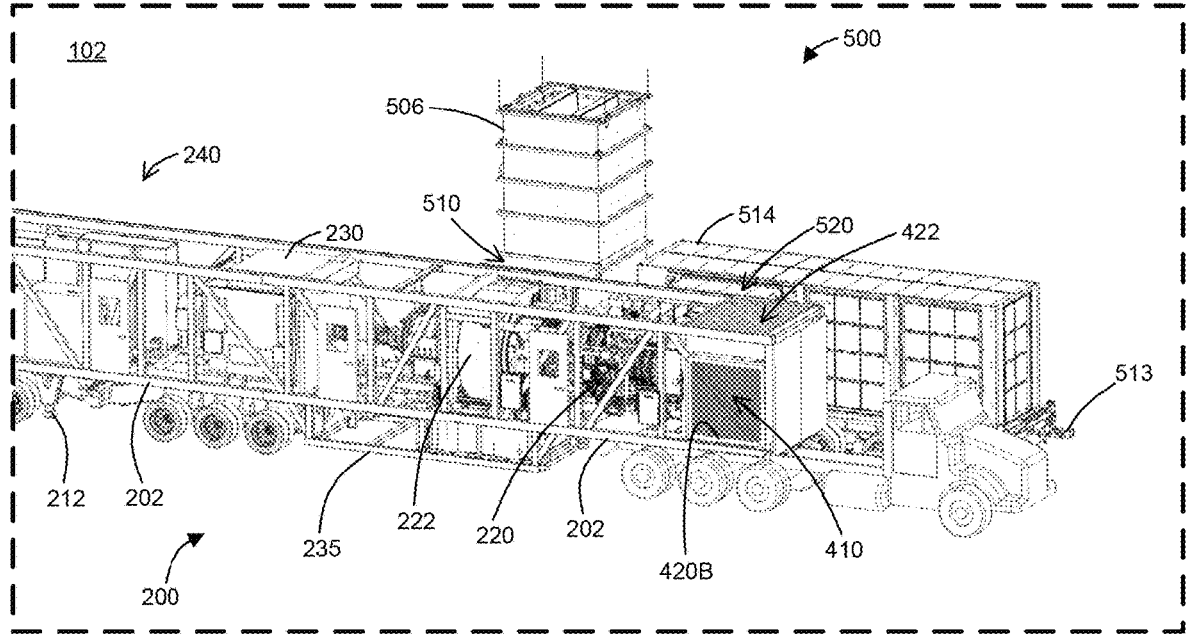
FIG. 10 is a schematic diagram showing a close up of a perspective view of a mobile source of electricity in an operation mode, in accordance with one or more embodiments.
Figure 11:
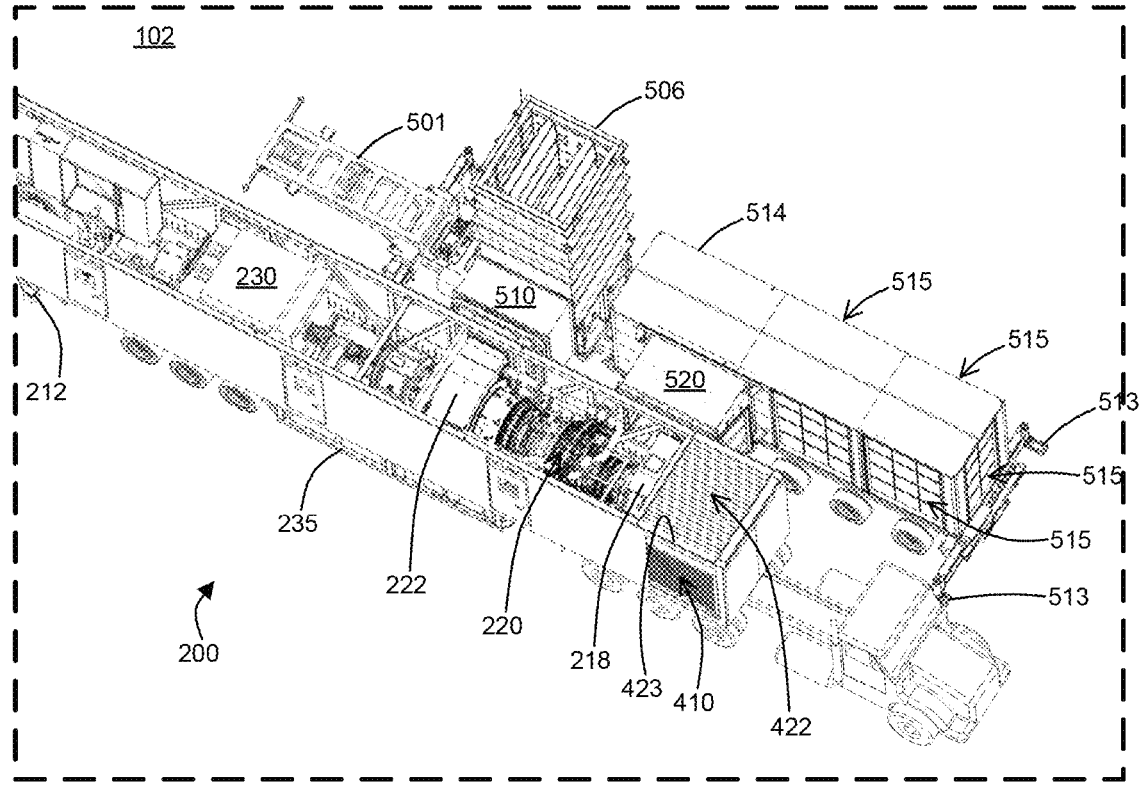
FIG. 11 is a schematic diagram showing a close of another perspective view of a mobile source of electricity in an operation mode, in accordance with one or more embodiments.

Although not specifically shown in FIGS. 5-6, the air handling transport 500 may include additional components such as a transformer, an automatic transfer switch (ATS), a black start generator, and a battery cabinet. In one or more embodiments, one or more of the transformer, the ATS, the black start generator, and the battery cabinet may instead be on the power generation transport 200. The transformer may be configured to receive power at a higher voltage (e.g., 13.8 kV) and step down the voltage (e.g., to 480V) so that it can be utilized for various applications requiring the low voltage. The transformer may be operated via the ATS, that may take in power at a higher voltage (e.g., 13.8 kV), and switch and reduce it to a lower voltage (e.g., 480V) through the transformer for turbine control power. The black start generator may be configured to provide power to start operation of the mobile source of electricity 102. For example, the black start generator may provide power to the gas turbine 220 to initialize operation of the gas turbine 220. The battery cabinet may include one or more batteries that may provide an alternate source of power and may be utilized to store electric power generated by, e.g., the 480V transformer.
Example Mobile Source of Electricity FIG. 7 is a schematic diagram showing a perspective view of a mobile source of electricity 102 including a power generation transport 200 and an air handling transport 500 in an operation mode, in accordance with one or more embodiments. FIG. 8 is a schematic diagram showing another perspective view of a mobile source of electricity 102 including a power generation transport 200 and an air handling transport 500 in an operation mode, in accordance with one or more embodiments. FIG. 9 is a schematic diagram showing a plan view of a mobile source of electricity 102 including a power generation transport 200 and an air handling transport 500 in an operation mode, in accordance with one or more embodiments. FIG. 10 is a schematic diagram showing a close up of a perspective view of a mobile source of electricity 102 including a power generation transport 200 and an air handling transport 500 in an operation mode, in accordance with one or more embodiments. FIG. 11 is a schematic diagram showing a close up of another perspective view of a mobile source of electricity 102 including a power generation transport 200 and an air handling transport 500 in an operation mode, in accordance with one or more embodiments.

As shown in FIGS. 7-11, the two transports are parked adjacent to each other during the operation mode. The inlet connection 520 and the exhaust connection 510 may move (e.g., using outriggers 511A and 511B) and connect (e.g., using the hydraulic walking system) respectively to the inlet ports 219, 225, and the outlet ports 226, 223, 227 without using external mechanical means in order to connect the air inlet filter housing 502 and the exhaust stack 504 of the air handling transport 500 to the power generation transport 200. The inlet connection 520 may move and connect the air inlet filter housing 502 of the air handling transport 500 and the inlet ports 219, 225 (or 420A, 219, 225) of the power generation transport 200. The exhaust connection 510 may move and connect the exhaust stack 504 of the air handling transport 500 and the outlet ports 226, 223, 227 of the power generation transport 200.

The two transports 200 and 500 may be parked at a predetermined orientation and distance such that the hydraulic walking system can be operated to connect the two transports 200 and 500 after the outriggers 511A and 511B have positioned the exhaust connection 510 and the intake connection 520 in their extended state for the operation mode. Arrangement of the components on the power generation transport 200 is not intended to be limiting. FIGS. 2-4 show an example configuration of the power generation transport 200 in which the lube oil radiators of the lube oil cooling system are disposed at a rear end of the power generation transport 200 and the generator compartment 240 is disposed at a front end. And FIGS. 7-11 show an example configuration of the power generation transport 200 in which the arrangement of the components is reversed with the lube oil radiators of the lube oil cooling system disposed at a front end of the power generation transport 200 and the generator compartment 240 is disposed at a rear end.

Thus, in one or more embodiments, connecting the two transports via the intake connection 520 and the exhaust connection 510 results in: (1) filtered combustion air being provided to the gas turbine 220 via the compartment 520A of the inlet connection 520; (2) filtered cooling air being provided to the gas turbine 220 enclosure for cooling the gas turbine 220 radiant heat via the compartment 520B of the inlet connection 520; (3) combustion exhaust air of the gas turbine 220 being discharged via the compartment 510B of the exhaust connection 510; (4) ventilation and cooling air of the gas turbine 220 enclosure being discharged via the compartment 510A of the exhaust connection 510; (5) ventilation and cooling air of the generator compartment 240 being discharged via the compartment 510C of the exhaust connection 510; (6) cooling air being provided to the lube oil radiators 410 for cooling the lube oil radiators 410 via the intake ports 420A and 420B of the power generation transport 200 by operating the exhaust fan 422; and (7) the ventilation and cooling air of the compartment with the lube oil radiators 410 being discharged via the exhaust port 423 disposed on top side 210 of the enclosure 205 of the power generation transport 200. As a result, connection and disconnection between the two transports 200 and 500 to transition the mobile source of electricity 102 between the transportation mode and the operation mode is simplified by requiring only the inlet connection 520 and the exhaust connection 510 to interconnect the two transports 200 and 500. Further, by discharging the exhaust air (e.g., combustion air, ventilation and cooling air for generator 230, ventilation and cooling air for gas turbine 220) via the same/single exhaust passage 506 of the exhaust stack 504, noise caused the mobile source of electricity 102 during the operation mode is significantly reduced.

Example Method of Producing Mobile Electric Power

FIG. 12 is a flow chart of an embodiment of a method 1200 to provide a mobile source of electricity 102. Method 1200 may start at block 1202 by transporting a mobile source of electricity 102 to a location where mobile electric power is needed. As shown in FIGS. 2-11, the mobile source of electricity 102 includes the power generation transport 200 and the air handling transport 500 that are separately and independently movable in the transportation mode, and that connect with each other during the operation mode without requiring any external mechanical apparatus.

Method 1200 may then move to block 1204 and convert the mobile source of electricity 102 from the transportation mode to the operation mode. The same transports may be used during the conversion from the transportation mode to the operation mode. In other words, transports are not added and/or removed when setting up the mobile source of electricity 102 for the operation mode. Additionally, method 1200 be performed without the use of a forklift, crane, and/or other external mechanical means to transition the mobile source of electricity 102 into the operational mode.

The conversion process for the two transports 200, 500 is described in more detail in FIGS. 2-11. More specifically, the two transports 200, 500 may be parked adjacent to each other and the outriggers 511A, 511B, and the hydraulic walking system can be operated connect the transports 200, 500 and place the mobile source of electricity 102 into the operation mode.

More specifically, the air handling transport 500 may be converted from the transportation mode to the operation mode as shown in FIGS. 5, 6 by lifting the exhaust passage 506 from the horizontal position to the vertical position to be positioned upright on the air handling transport 500 and operating the outriggers 511A to move the exhaust connection 510 in the side direction toward the power generation transport 200 to align and connect the vertical exhaust passage 506 with the exhaust connection 510. Similarly, the inlet connection 520 may be moved using the outriggers 511B in the side direction toward the power generation transport 200. The inlet and exhaust connections 510 and 520 may then be connected respectively to the inlet ports 219, 225, and the outlet ports 226, 223, 227 using the hydraulic walking system and without using external mechanical means to thereby connect the air inlet filter housing 502 and the exhaust stack 504 of the air handling transport 500 to the power generation transport 200.

Method 1200 may then move to block 1206 and generate electricity using the mobile source of electricity 102. In one or more embodiments, method 1200 may generate electricity by converting hydrocarbon fuel into electricity using the gas turbine 220 and the generator 230 of the power generation transport 200.

Method 1200 may then move to block 1208 and convert the mobile source of electricity 102 from the operation mode to the transportation mode. Similar to block 1204, the conversion process for block 1208 may use the same transports without using a forklift, crane, and/or other external mechanical means to transition the mobile source of electricity 102 back to transportation mode.

Method 1200 may then move to block 1210 to remove the mobile source of electricity 102 once the power generation is no longer needed at the location.

Other Considerations

At least one embodiment is disclosed and variations, combinations, and/or modifications of the embodiment(s)

and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system for providing mobile electric power, the system comprising:

a first transport including a gas turbine;

a second transport including an exhaust passage, and wherein, in an operation mode, the first transport and the second transport are connected to each other at an exhaust connection between a facing side of the first transport and a facing side of the second transport, wherein the first transport further includes a first outlet port, a second outlet port, and a third outlet port on the facing side of the first transport, wherein the exhaust connection exhausts air to the exhaust passage from the first outlet port, the second outlet port, and the third outlet port, and wherein the exhaust connection includes first and second partition walls to define a first compartment, a second compartment, and a third compartment within the exhaust connection, the first compartment connected to the first outlet port, the second compartment connected to the second outlet port, and the third compartment connected to the third outlet port.

2. The system of claim 1, wherein the exhaust connection is a single connection that is adapted to connect with the first, second, and third outlet ports of the first transport.

3. The system of claim 1, wherein the first, second, and third compartments respectively connect with the first, second, and third outlet ports such that exhaust air discharged from one of the first, second, and third outlet ports does not feed back into another one of the first, second, and third outlet ports.

4. The system of claim 1, wherein the first outlet port exhausts combustion air from an exhaust of the gas turbine, the second outlet port exhausts cooling air from a compartment of the first transport housing the gas turbine, and the third outlet port exhausts cooling air from a compartment of the first transport housing a generator.

5. The system of claim 4, wherein the compartment of the first transport housing the gas turbine further houses a lube oil radiator, and wherein the second outlet port exhausts cooling air that cooled the lube oil radiator.

6. The system of claim 4, wherein the compartment of the first transport that houses the generator further houses electrical components and electronic components.

7. The system of claim 6, wherein the first transport further includes an intake louver port on an end side of the first transport that is perpendicular to the facing side of the first transport, the intake louver port configured to draw ambient air into the generator compartment to cool the generator, the electrical components, and the electronic components.

8. The system of claim 1, wherein the second transport further includes an actuator, the actuator being operable to lower the exhaust passage in a transportation mode and raise the exhaust passage vertically to an upright position in the operation mode.

9. The system of claim 8, wherein the second transport further includes outriggers, the outriggers being operable to slide out the exhaust connection in a lateral direction toward the facing side of the first transport in the operation mode, and slide in the exhaust connection to be contained within dimensions of the second transport in the transportation mode.

10. The system of claim 9, wherein in the operation mode, a downstream end of the exhaust connection moved outward toward the first transport aligns and connects with an opening of the exhaust passage in the upright position.

11. The system of claim 1, wherein:

the first transport further includes a first inlet port and a second inlet port on the facing side of the first transport, the second transport further includes an air inlet filter housing having an intake connection for providing filtered air to the first transport, and the intake connection is a single connection that is adapted to connect with the first and second inlet ports of the first transport to provide the filtered air, the intake connection including a partition wall that defines first and second compartments within the intake connection, the first compartment connected to the first inlet port and the second compartment connected to the second inlet port.

12. The system of claim 11, wherein the first inlet port provides the filtered air as combustion air to an intake of the gas turbine, and wherein the second inlet port provides the filtered air as cooling air to an enclosure compartment to cool the gas turbine.

13. The system of claim 11, wherein the first transport further includes a third inlet port adjacent to the first and second inlet ports on the facing side, wherein a lube oil radiator is disposed in the third inlet port.

14. The system of claim 13, wherein the first transport further includes an exhaust fan mounted to a roof of an enclosure of the first transport, wherein the exhaust fan is operable to draw in ambient air from the third inlet port to cool lube oil in the lube oil radiator.

15. An air handling transport comprising:

a base frame;

an exhaust passage mounted to the base frame;

an exhaust connection mounted to the base frame; and wherein the exhaust connection is adapted to slide out in an operation mode toward a facing side of a separate power generation transport, wherein the exhaust connection includes first and second partition walls to define a first compartment, a second compartment, and a third compartment within the exhaust connection, wherein the first, second, and third compartments are respectively connectable to first, second, and third outlet ports provided on the facing side of the separate power generation transport.

16. The air handling transport of claim 15, wherein the exhaust connection is a single connection that is adapted to connect with the first, second, and third outlet ports of the separate power generation transport, and wherein the first, second, and third compartments respectively connect with the first, second, and third outlet ports such that exhaust air discharged from one of the first, second, and third outlet ports does not feed back into another one of the first, second, and third outlet ports.

17. The air handling transport of claim 15, wherein the first compartment receives combustion air discharged from an exhaust of a gas turbine mounted on the separate power generation transport, the second compartment receives ventilation and cooling air discharged from a compartment of the separate power generation transport housing the gas turbine, and the third compartment receives ventilation and cooling air discharged from a compartment of the separate power generation transport housing a generator.

18. The air handling transport of claim 15, further comprising:

an actuator mounted to the base frame and being operable to lower the exhaust passage in a transportation mode and raise the exhaust passage vertically to an upright position in the operation mode; and outriggers mounted to the base frame and being operable to slide out the exhaust connection in a lateral direction toward the facing side of the separate power generation transport in the operation mode, and slide in the exhaust connection in a direction away from the facing side of the separate power generation transport in the transportation mode, wherein in the operation mode, a downstream end of the exhaust connection moved outward toward the separate power generation transport aligns and connects with an opening of the exhaust passage in the upright position.

19. A method for providing mobile electric power, the method comprising:

operating a gas turbine and a generator mounted on a first transport;

channeling exhaust air from first, second, and third outlet ports on a facing side of the first transport to an exhaust connection on a facing side of a second transport, wherein the exhaust connection includes first and second partition walls to define a first compartment, a second compartment, and a third compartment within the exhaust connection, wherein the first, second, and third compartments are respectively connectable to the first, second, and third outlet ports provided on the facing side of the first transport; and releasing the exhaust air channeled into the exhaust connection from a top of an exhaust passage mounted on the second transport.

\* \* \* \* \*